United States Patent [19]
Acampora

[11] Patent Number: 4,982,283
[45] Date of Patent: Jan. 1, 1991

[54] LINE-SEQUENTIAL PYRAMID PROCESSING OF A PLURALITY OF RASTER-SCANNED IMAGE VARIABLES

[75] Inventor: Alfonse A. Acampora, Staten Island, N.Y.

[73] Assignee: General Electric Company, Schenectady, N.Y.

[21] Appl. No.: 190,905

[22] Filed: May 6, 1988

[51] Int. Cl.$^5$ .............................................. H04N 7/12
[52] U.S. Cl. .................................... 358/133; 358/160; 382/49
[58] Field of Search ............... 358/140, 160, 138, 133; 382/49, 56

[56] References Cited

U.S. PATENT DOCUMENTS

| | | | |
|---|---|---|---|
| 4,447,886 | 5/1984 | Meeker | 364/725 |
| 4,674,125 | 6/1987 | Carlson et al. | 382/49 |
| 4,709,394 | 11/1987 | Bessler et al. | 382/49 |
| 4,718,104 | 1/1988 | Anderson | 382/41 |
| 4,813,056 | 3/1989 | Fedele | 375/27 |
| 4,843,468 | 6/1989 | Drewery | 358/140 |
| 4,918,524 | 4/1990 | Ansari et al. | 358/138 X |

OTHER PUBLICATIONS

J. W. Woods & S. D. O'Neill, "Subband Coding of Images", Oct. 1986, IEEE Transactions on Acoustics, Speech & Signal Processing, vol. ASSP-34, pp. 1278-1288.

S. Maliat, "An Efficient Image Representation for Multi-Scale Analysis", Topical Meeting on Machine Vision, Mar. 18-20, 1987, Incline Village, Nevada.

A. H. Tan, K-M. Liu, K-H. Tzou & E. B. Vogel, "An Efficient Pyramid Image Coding System": Proceedings ICASSP 87, vol. 2, pp. 18.6.1-186.6.4.

Primary Examiner—Victor R. Kostak
Attorney, Agent, or Firm—Paul R. Webb, II; James C. Davis, Jr.

[57] ABSTRACT

A plurality of raster-scanned image variables are time-compressed and time-division multiplexed on a line-sequential basis for pyramid analysis. The resulting differential pulse code modulation is statistically encoded and assembled together with digital audio code and synchronizing code. The assembler supplies a serial stream of bits to a transmitter. Receiving apparatus for a video teleconferencing station includes a receiver complementary to the transmitter and a parser for separating digital codewords. Those codewords that are statistical codes descriptive of differential pulse code modulation of video are demodulated. The demodulation results are formatted for a pyramid synthesizer. The stream of samples provided as output signal from the pyramid synthesizer is time-division demultiplexed and time expanded to recover the plurality of raster-scanned image variables.

14 Claims, 5 Drawing Sheets

LINE-SEQUENTIAL PYRAMID PROCESSING OF A PLURALITY OF RASTER-SCANNED IMAGE VARIABLES

The present invention relates to the pyramid processing of a plurality of raster-scanned image variables being carried out substantially parallel in time.

BACKGROUND OF THE INVENTION

One place parallel-in-time pyramid processing of a plurality of raster-scanned image variables is of interest is in increased depth-of-focus cameras as described by E. H. Adelson in U.S. Pat. No. 4,661,986 issued 28 Apr. 1987 and entitled "DEPTH-OF-FOCUS IMAGING PROCESS METHOD". Another place such parallel-in-time pyramid processing of a plurality of raster-scanned image variables is of interest is in the splining together of component sub-images from respective cameras to form as a mosaic a complete image too large in area to be acquired by a single camera. Such a procedure is taught by P. J. Burt in his U.S. patent application No. 020,818 filed 2 Mar. 1987, entitled "PYRAMID PROCESSOR FOR BUILDING LARGE-AREA, HIGH-RESOLUTION IMAGE BY PARTS" and assigned at time of filing to RCA Corporation, merged 18 Dec. 1987 into General Electric Company. Another place such parallel-in-time pyramid processing is of interest is in the description of full color images in terms of component color variables. These component color signals may consist of luminance (Y), in-phase chrominance (I) and quadrature-phase chrominance (Q) variables, by way of example; or may consist of red (R), green (G) and blue (B) tri-stimulus variables, by way of further example; or may consist of other groups of variables, as known to those skilled in the art of colorimetry.

Pyramid processing includes spatial-frequency analysis done by an iterative spatial filtering procedure performed (usually in two orthogonal spatial dimensions) on images as described in sampled-data terms, which processing dissects the image into component spatial-frequency spectra, the dissection process analyzing an image variable into component band-pass octave-width spectra and a remnant low-pass spectrum. The band-pass spectra are sometimes referred to as "Laplacian" responses and the remnant low-pass spectrum, as a "Gaussian" response.

Pyramid processing may also include a subsequent synthesis of an image-descriptive variable from its component spatial-frequency spectra. Since the successively lower-spatial-frequency octaves are customarily sampled at successively lower density in each spatial-dimension in the analysis procedure, these lower-spatial-frequency octaves and the remnant low-pass spectrum are resampled using interpolative techniques to permit the additive combination of the various spectral components at the full sampling density of the image variable recovered by the subsequent synthesis procedure.

Pyramid processing is useful, for example, in the digital transmission of images, with the spatial-frequency analysis being performed at the sending station to generate streams of digital data for subsequent coding to remove redundancy before transmission. The transmission is decoded at the receiving station to regenerate the stream or streams of digital data which are used in a spatial-frequency synthesis procedure to regenerate descriptions of the images. The streams of digital data generated by the spatial-frequency analysis procedure can be condensed into a single stream of digital bits for coding purposes. This is generally a preferable procedure to do. This procedure is especially satisfactory when the coding procedure involves the step of temporal differential pulse code modulation of the type known as "delta-frame". In delta-frame DPCM image samples separated one frame duration in time are differentially combined and the resultant difference is quantized to generate a differential pulse code modulation (DPCM) signal. The procedure is especially satisfactory because the distributions of the amplitudes of DPCM signal responses to different image variable components usually tend to resemble each other more than do the distributions of the amplitudes of the components themselves. DPCM signal amplitudes tend to have Laplacian distributions with zero means.

A number of different pyramid processing procedures are known, and in the digital transmission of images it is generally desirable to carry any such procedure forward on a pipeline basis. In U.S. Pat. No. 4,674,125 issued 16 June 1987, entitled "REAL-TIME HIERARCHAL PYRAMID SIGNAL PROCESSING APPARATUS", and incorporated herein by reference, C. R. Carlson, J. H. Arbeiter and R. F. Bessler describe pipeline procedures for implementing pyramid processing procedures, especially the Burt pyramid processing procedure well known to those skilled in the art. C. H. Anderson describes another pyramid processing procedure suitable for pipelined implementation in U.S. Pat. No. 4,718,104 issued 5 Jan. 1988 and entitled "FILTER-SUBTRACT-DECIMATE HIERARCHAL PYRAMID SIGNAL ANALYZING AND SYNTHESIZING TECHNIQUE." In the Burt pyramid and in the Anderson F-S-D pyramid, all spatial-frequency analysis components are omnidirectional in nature. Despite decimation by 2:1 in each spatial direction from each octave to the next lower in the spatial-frequency analysis by octaves, the total number of samples in the set of spatial-frequency analyses (in the limit) increases by one-third.

Newer pyramid processing procedures separate each octave band of spatial-frequency components into three portions, one having similar value horizontal and vertical components in the octave, one having only excess horizontal component in the octave, and one having only excess vertical component in the octave. These three portions can be spatially decimated, so the total number of samples in the set of spatial analyses of a signal is no larger than the number of regularly spaced samples in that original signal itself. Such pyramid processing procedures are described by J. W. Woods and S. D. O'Neill in their paper "Subband Coding of Images" appearing on pp. 1278–1288 of the IEEE TRANSACTIONS ON ACOUSTICS, SPEECH, AND SIGNAL PROCESSING, Vol ASSP-34, Oct. 1986; are described by S. Mallat in his paper "An Efficient Image Representation for Multiscale Analysis" in the TOPICAL MEETING ON MACHINE VISION summaries of papers presented at the Machine Vision Topical Meeting 18–20 Mar. 1987 at Incline Village, Nev., as published by the Optical Society of America, Washington, DC; and are described by A. H. Tan, K-M Liu, K-H Tzou and E. B. Vogel in their paper "An Efficient Pyramid Image Coding System" in the PROCEEDINGS ICASSP 87, Vol 2, pp 18.6.1-4, published by the IEEE.

The reiterative nature of the digital filtering in pyramid processing and the successive spatial decimation by octave have led fellow workers in the field to consider whether hardware savings may be effected by time-division-multiplexing of multiply-used digital hardware in pipelined pyramid processing. The reader is referred to U.S. Pat. No. 4,709,394 entitled "MULTIPLEXED REAL-TIME PYRAMID SIGNAL PROCESSING SYSTEM" issued 24 Nov. 1987 to R. F. Bessler, J. H. Arbeiter and J. O. Sinninger, in which multiplexing of digital hardware allows the same hardware to be used in a succession of the successive spatial-frequency filtering procedures used in developing separate octaves of filter response from a single signal.

Of interest is U.S. Pat. No. 4,447,886 issued 8 May 1984 to G. William Meeker and entitled "TRIANGLE AND PYRAMID SIGNAL TRANSFORMS AND APPARATUS". In reference to FIG. 38 of his patent Meeker describes time-division mutiplexed use of pyramid analyzer apparatus sequentially selecting Y, I and Q samples to each processing block transformer in every successive band of spatial-frequency analysis. This differs from time-division multiplexing the input signal to a complete pipeline processing system, as the present inventor advocates, inasmuch as the input signal to each successive stage of pyramid analysis must be separately time-division-multiplexed with regard to its input signal. The Meeker procedure presents cumbersome control problems in dedicated digital hardware used for pyramid analysis. A similar observation can be made with regard to dedicated digital hardware used for pyramid synthesis that uses a time-division-multiplexing procedure similar to that which Meeker advocates for a pyramid analyzer. The Meeker procedure and variants of it are even more awkward to implement in pyramid processing hardware when I and Q are sub-sampled respective to Y.

A constraint that limited prior art thinking is the consideration of the color variables simply in terms of separate respective image fields each conformally mapping point-by-point to the original scene presented to the camera according to the same mapping transform. The present inventor removed this constraint upon thinking about pyramidal processing of data, with the realization that a plurality of image-descriptive variables can be time-division multiplexed into a single serial data stream for plural-stage pipelined pyramid processing, which serial data stream describes a raster-scanned composite image field. This composite image field does not conformally map point-by-point to the original scene presented to the camera. Rather plural points in the composite image field, one for each variable, conformally map to the original scene presented to the camera. Multi-stage pipelined pyramid processing is performed on an input signal generated by time-division multiplexing the samples of a plurality of image variables together in a serial data stream.

Time-division multiplexing is preferably done so as to avoid the introduction of excessive high-spatial-frequency content into the serial stream describing the raster-scanned composite image field. This facilitates dropping the transmission of high-spatial-frequency content at times the bandwidth capabilities of the data link tend otherwise to be exceeded, without occurring unacceptable loss in the quality of the transmitted color image. Time-division multiplexing a plurality of variables on a sequential-pixel basis strongly tends to introduce high-spatial-frequency content since at most times the variables are apt to be unalike in value. Time-division multiplexing on a sequential-field or (sequential-frame) basis does not tend to introduce more high-spatial-frequency content into the serial stream. However, it tends to require a burdensome amount of temporary storage time for compressing and interleaving the fields (or frames). That is, the processing of the plurality of raster-scanned image variables is not carried out sufficiently parallel in time.

The present inventor finds it preferable to time-division-multiplex the plurality of image variables on line-sequential basis in the input signal to a pyramid analyzer or in the output signal from a pyramid synthesizer. The raster-scanned composite image field resulting from such multiplexing resembles the component image fields of the respective image variables arranged in side-by-side relationship. Not much additional high-spatial-frequency content is introduced by line-sequential time-division multiplexing, and the temporary storage requirements for such multiplexing are not onerous.

SUMMARY OF THE INVENTION

A first aspect of the present invention is the line-sequential spatial-frequency filtering of a plurality of different raster-scanned variables, each having the same number of scan lines per frame. The variables are supplied to respective time compressors each having capacity to compress a full scan line of samples. The scan line compressors resample the raster-scanned variables to time-division multiplex them on a line-sequential basis. In effect, the line-sequential sampling of these respective variables arranges their sample fields side by side as components of a larger, raster-scanned sample field. The resultant composite signal raster-scanning the larger sample field is applied as input signal to a subsequent spatial-frequency filter.

In a further aspect of the invention the spatial filter is a pyramid analyzer In a still further aspect of the invention the pyramid analyzer results are reformatted and subjected to differential pulse code modulation and statistical coding procedures.

In yet another aspect of the invention, the spectral analyses from such a line-sequential pyramid analyzer, or the lower-spatial frequency components thereof, are subsequently (e.g. after transmission through a data link) supplied to a pyramid synthesizer, and the synthesis results are supplied to time-division-demultiplexing and time-decompressing apparatus to recover replicas of the plurality of different raster-scanned variables.

DETAILED DESCRIPTION

Figure 1:
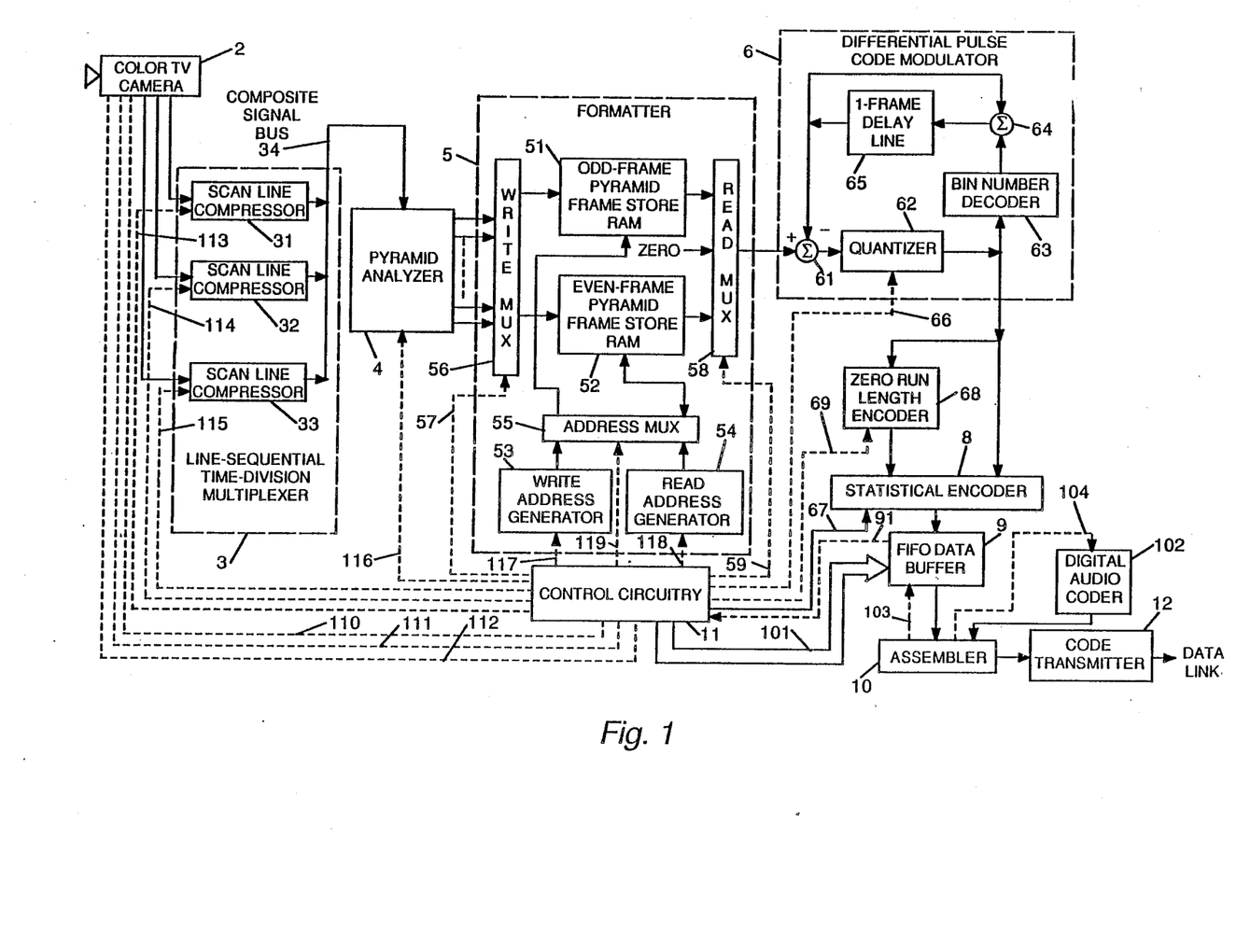
FIG. 1 is a schematic diagram of the sending apparatus in a video teleconferencing station, which sending apparatus embodies an aspect of the invention.

FIG. 1 illustrates the use of line-sequential pyramid processing in the sending apparatus of a video teleconferencing station. A color television camera 2 is of a type supplying three color-descriptive digital signals (e.g. Y,I,Q or R,G,B) parallel in time to a time-division multiplexer 3. Multiplexer 3 converts the three color-descriptive signals to line-sequential format appearing on a composite signal bus 34. The line-sequential composite signal is applied to the input port of a pyramid analyzer 4 in accordance with the invention. The spatial-frequency analyses from pyramid analyzer 4 are supplied in parallel to a sample formatter 5. Formatter 5 rearranges the samples of the various spatial-frequency analyses into a serial data stream for application to a differential pulse code modulator 6.

Differential pulse code modulator 6 is shown as being of the delta-frame type, which compares samples separated by a frame time duration, but located similarly within raster space. Strings of successive zero values in the resulting differential pulse code modulation (DPCM) signal are counted by a zero run-length encoder 68. A statistical encoder 8, which may be a Huffman encoder or a variant thereof, generates differing length self-parsing codewords responsive to each zero run-length value and each non-zero value of the DPCM signal, the length of the codeword depending on the frequency of occurrence of the value being encoded.

The successive codewords are forwarded to a first-in/first-out (FIFO) data buffer 9, where they have time-division multiplexed with them synchronization and control codewords received from control circuitry 11 via a channel 101. FIFO data buffer 9 includes random-access memory (RAM) with respective addressable storage locations for each successive codeword received, an accumulator for binary ones to generate write addresses for its RAM, an accumulator for binary ones to generate read addresses for its RAM, and a subtractor for calculating from the current ones of those addresses how many of the storage locations in its RAM are occupied, or filled.

The codewords read from data buffer 9 are supplied to an assembler 10, there to have time-interleaved with them synchronization codewords received via a channel 101 from control circuitry 11 and digital audio codewords supplied from a digital audio coder 102. Assembler 10 controls via a connection 103 its supply of codewords from data buffer 9. Assembler 10 controls via a connection 104 its supply of codewords from digital audio coder 102. Assembler 10 reformats the resulting succession of digital codewords into a serial stream of bits for application to a code transmitter 12. Code transmitter 12 transmits the code on a modulated carrier via a data link (not shown). E.g., the transmission may be a phase shift keying (PSK) transmission of one of the known PSK types.

One may view the FIFO data buffer 9 as performing a portion of an overall assembly process completed in assembler 10. One way to run the overall assembly process is to divide digital audio into segments descriptive of sound during respective camera 2 fields. A respective one of these segments is inserted each time after assembler 10 receives an end-of-field synchronization codeword from FIFO data buffer 9. After the digital audio segment data is again taken from FIFO data buffer 9, beginning with a beginning-of-field synchronization codeword. What is important is that the overall assembly process be one that is designed to accommodate the fact that uniform duration segments of digital video and digital audio are coded to form respective bit stream segments that vary in duration.

Control circuitry 11 synchronizes operation of the various parts of the FIG. 1 sending apparatus. One aspect of this synchronization of operation, already mentioned, is the generation of digital synchronization codewords supplied via channel 101 to assembler 10 to be coded and transmitted by transmitter 12 over the data link for reception by the receiving apparatus of another teleconferencing station. These synchronization codewords are also decoded within assembler 10 to control its prioritization of codewords respectively from buffer 9 and from digital audio coder 102. Another aspect of this synchronization performed by control circuitry 11 is monitoring via connection 91 how many of the storage locations in FIFO date buffer 9 are occupied. Control circuitry 11 controls operation to keep occupancy of data buffer 9 under control, as will be further described later on in this specification.

As a part of its operation control circuit 11 exchanges horizontal retrace, vertical retrace and camera pixel clock information with camera 2 via connections 110, 111 and 112. The camera pixel clock information specifies when analog-to-digital conversion circuitry in camera 2 samples color-descriptive analog signals to generate the color-descriptive digital signals applied to multiplexer 3. Control circuitry 11 responds to the horizontal retrace and vertical retrace information exchanged with camera 2 to generate certain of the synchronization codewords it supplies to FIFO data buffer 9 via channel 101. These certain synchronizing codewords typically include a beginning-of- frame codeword, an end-of-frame codeword, and modulo-two frame count codewords. Codewords for parsing scan lines may also be generated.

Time-division multiplexer 3 is shown as comprising scan line compressors 31, 32 and 33 respectively associated with separate ones of the color-descriptive digital signals. Control circuitry 11 furnishes timing control information to each of the scan line compressors 31, 32 and 33 via respective multiple-conductor connections 113, 114 and 115.

Figure 2:
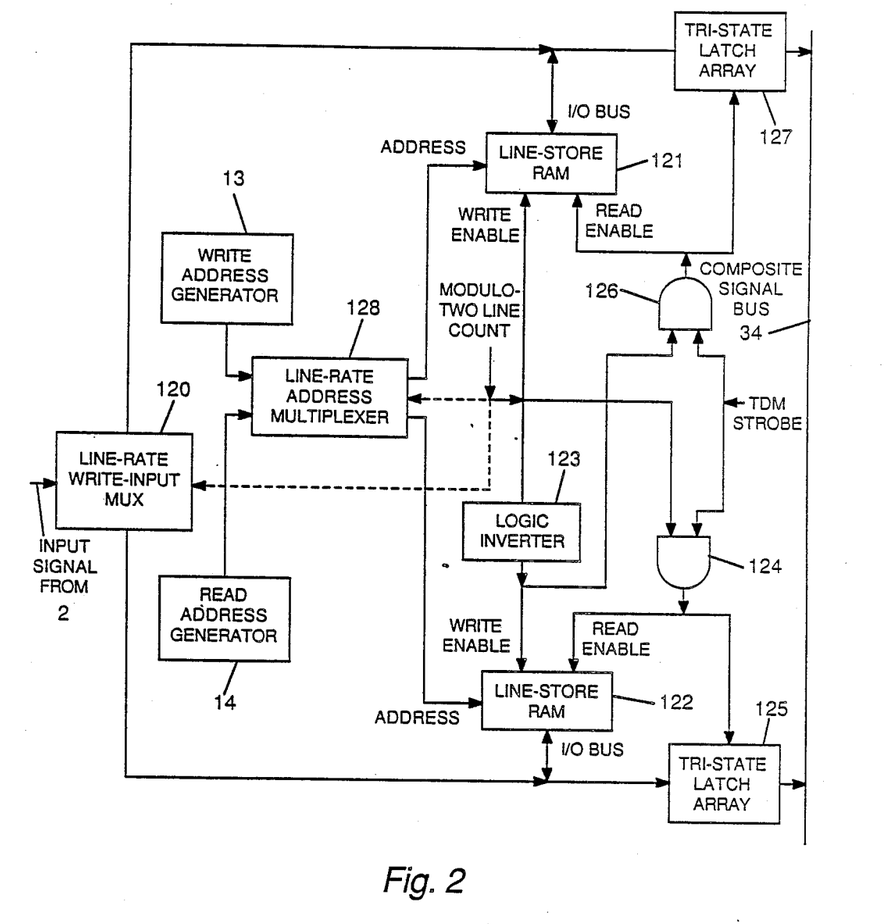
FIG. 2 is a schematic diagram of a scan line compressor as can be used in the FIG. 1 apparatus.

FIG. 2 shows a form that any one of the scan line compressors 31-33 can take. Successive scan lines in camera 2 output signals are considered to be consecutively numbered beginning with unity in each frame. A write-input multiplexer 120 responds to modulo-two scan line count, as supplied from control circuitry 11, to select odd-numbered scan lines of a camera 2 output signal to the input/output bus of a first random-access memory 121 and to select even-numbered scan lines of that camera 2 output signal to the input/output bus of a second random-access memory 122. A preferable way to construct multiplexer 120 is using respective banks of tri-state latches to supply data to input/output busses of RAMs 121 and 122. The rank of tri-state latches supplying data to the input/output bus of RAM 121 is placed into a high-output-impedance state during even-numbered scan lines, so reading from RAM 121 is not interfered with; and the rank of tri-state latches supplying data to the input/output bus of RAM 122 is placed into high-output-impedance state during odd-numbered scan lines, so reading from RAM 122 is not interfered with. Each of the RAMs 121 and 122 has sufficient addressable memory locations to store respective ones of each of the samples in a scan line of camera 2 output signal and is therefore denominated a "line store" RAM.

Modulo-two line count is applied to the write enable connection of RAM 121, conditioning RAM 121 for writing only during odd-numbered lines. Modulo-two line count is supplied to a logic inverter 123. The resulting complement of line count supplied from inverter 123 is applied to the write enable connection of RAM 122, conditioning RAM 122 for writing only during even-numbered lines.

An AND gate 124 conditionally applies modulo-two line count, during a unit-value TDM strobe pulse only, to the read enable connection of RAM 122 and to tri-state latch array 125. RAM 122 is thereby conditioned for reading during odd-numbered lines and tri-state latch array 125 is thereby conditioned to connect the input/output bus of RAM 122 to composite signal bus 34 with low source impedance, so long as the unit-value TDM strobe pulse obtains.

An AND gate 126 conditionally applies the complement of modulo-two line count, during unit-value TDM strobe pulse only, to the read enable connection of RAM 121 and to tri-state latch array 127. RAM 121 is thereby conditioned for reading during even-numbered lines and tri-state latch array 127 is thereby conditioned to apply the signal on the input/output bus of RAM 122 to composite signal bus 34 with low source impedance, so long as the unit-value TDM strobe pulse obtains.

During zero-value intervals between TDM strobe pulses, neither of the tri-state latch arrays is conditioned to provide low source impedance to composite signal bus 34. This in effect disconnects bus 34 from the FIG. 2 scan line compressor, so bus 34 may have at least one other scan line compressor connected to it on a time-interleaved basis.

Modulo-two line count also controls an address multiplexer 128, which selects the output of a write address generator 13 to the address port of RAM 121 during odd-numbered lines and to the address port of RAM 122 during even-numbered lines. Address multiplexer 128 also selects the output of a read address generator 14 to the address port of the one of the RAMs 121 and 122 not selected to receive the output of write address generator 13.

Write address generator 13 typically includes a pixel counter reset to zero at the beginning of each scan line and counting throughout each scan line at camera 2 pixel scan rate for the particular image variable of concern. This pixel counter supplies its count as write address output for generator 13. Read address generator 14 typically includes a counter counting at higher rate than the pixel counter in write address generator 13. This higher counting rate provides for scan line compression.

In practice, it is convenient to use a single pixel counter counting at Y scan rate to provide write addresses to the line-store RAMs selected for writing in each of the scan line compressors 31–33. Where I and Q scan rates are octaves lower than Y scan rate, only the more significant bits of the pixel count are used as write addresses to the line-store RAMs in them selected for writing.

Also it is convenient to use a single higher rate counter to generate from the less significant bits of its count read addresses for the line-store RAMs selected for reading in each of the scan line compressors 31–33. The more significant bits of its count can be decoded to generate cyclically the TDM strobe pulses for each of the scan line compressors 31–33.

Returning to FIG. 1, the responses of pyramid analyzer 4 are supplied in parallel to converter 5 and are converted by formatter 5 to a single serial stream of data words for application to differential pulse code modulator 6, which may be of a conventional design. It is preferable to use a DPCM where samples similarly located in raster-scan space, but differently located in time, are differentially combined since the time-integrating properties of the human visual system make quantization errors less noticeable. In modulator 6 the current-frame samples of pyramid-analyzed video are differentially combined with the corresponding previous-frame samples in subtractor 61. The resulting difference signal is assumed to have at least one more bit per sample than the video output signals of camera 2 in order to preserve the amplitude resolution afforded by the camera. Indeed, the difference signal may have a few additional bits acquired during pyramid analysis in order to avoid amplitude error giving rise to apparent spatial phasing error (e.g. spurious raggedness in smooth edges).

A quantizer 62 sorts the difference signals into a number of range bins respectively assigned ones of consecutive ordinal numbers describable in appreciably fewer bits than the difference signals themselves are. For example, the bins may be identified by respective five-bit numbers. A bin number decoder 63 converts the bin number to the nominal value for all of the difference signals sorted to that bin, thereby to generate one addend supplied to an adder 64. The other addend supplied to adder 64 is the predicted value of the current-frame sample supplied as subtrahend to subtractor 61. The sum from adder 64 provides the predicted value for the next frame, which is delayed for a frame time by a one-frame delay line 65. The one-frame delay line 65 is typically provided by a RAM operated in a read-modified-write mode and addressed by a counter continuously clocked at the modulator 6 sample rate.

Suppose quantizer 62 is a linear quantizer, one where quantization is carried out simply by rounding subtractor 61 difference signal to the closest few-bit number. Then bin number decoder 63 can be replaced by direct connection. Quantizer 62 may be one that has the boundaries of its range bins adjusted during operation responsive to a control signal received via connection 66 from control circuitry 11. This adjustment is one of those that may be made by control circuitry 11 responsive to information received via connection 67 that the FIFO data buffer 9 is being under-filled or over-filled in unacceptable degree.

In areas of the raster where there is not much frame-to-frame change, the DPCM signal from modulator 6 will be zero-valued, presuming quantizer 62 assigns all low-valued input signals a range bin number of zero. In recognition of the fact that such lack of frame-to-frame change is likely to occur a good percentage of the time, encoder 68 is used to encode the duration of a run of successive zero-valued DPCM samples with the objective of describing that run in fewer bits than the collective number of bits in these zero-valued samples. The zero run-length values may then be statistically encoded together with non-zero values in the statistical coder 8. Less frequently encountered zero run lengths may be more efficiently coded by coding a marker that such condition obtains to be followed by a hiatus in statistical coding during which time the run length value in straight binary code is forwarded to data buffer 9 as input signal. For a more complete discussion of these techniques for further encoding the DPCM signal from modulator 6, one is referred to N. J. Fedele's U.S. patent application Ser. No. 130,379 filed 8 Dec. 1987, entitled "MODIFIED STATISTICAL CODING OF DIGITAL SIGNALS" and assigned to General Electric Company.

Where zero-run-length encoding of DPCM signals from modulator 6 is pursued, it is generally advantageous to have the formatter 5 pack the serial sample stream it supplies to modulator 6 such that zero run lengths are longer in duration This desideratum can be more often achieved if one brings the pyramid analyses of the color variables arising from the same area of the scene presentation to camera 2 into better time alignment in the serial data stream supplied to modulator 6. This is possible to do because pyramid transforms are localized spatial transforms. The differential delays of pyramid components caused by line-sequential processing should be reduced insofar as possible. Also any time skew between various spatial frequency analyses introduced by the iterative hierarchal filtering and decimation processes should be compensated for.

In pursuance of these goals formatter 5 includes two-frame store RAMs 51 and 52 for storing odd-frame pyramid analyses and for storing even-frame pyramid analyses, respectively. Preferably pyramid analyzer 4 is one using successive ranks of quadrature mirror filters, which avoids time skew and keeps the number of samples in the pyramid analyses the same as the number of samples in the signal being analyzed. It is convenient to make the quadrature mirror filters separable, filtering first in the direction parallel to line scan and then filtering in the direction perpendicular to line scan. Then, decimation in the direction parallel to line scan reduces the number of samples and the sample rate into the ensuing transverse filtering. It is also convenient to use poly-phase filtering in the direction parallel to line scan to halve sample rate in that direction. If odd-symmetry kernels are employed in the quadrature mirror filters, a one-pixel offset occurs between the decimated high-pass and low-pass spatial filter responses in each direction. Accordingly, the pipelined pyramid analyzer 4 results will be in time-division-multiplexed relationship, which simplifies timing the writing and reading of RAMs 51 and 52.

A write address generator 53 and a read address generator 54 in formatter 5 can then generate respective sequences of addresses at the same clock rate as each other and as the pixel clock rate of the pyramid analyzer 4. Control circuitry 11 supplies this same rate clock to analyzer 4 via a multiple-conductor connection 116, to write address generator 53 via a multiple-conductor connection 117 and to read address generator 54 via a multiple-conductor connection 118. These multiple-conductor connections 116, 117 and 118 also carry line synchronization and frame-count-modulo-two information from control circuitry 11 to analyzer 4, to write address generator 53, and to read address generator 54, respectively. (The relationship between the write addresses generator 53 and the read addresses supplied by read address generator 54 may also incorporate some degree of positional coding to provide a better degree of security for the video teleconferencing transmissions.)

An address multiplexer 55 responds to modulo-two frame-count supplied it via a connection 119 from control circuitry 11, for applying write addresses from generator 53 to RAM 51 during odd-numbered frames and to RAM 52 during even-numbered frames, and for applying read addresses from generator 54 to RAM 52 during odd-numbered frames and to RAM 51 during even-numbered frames. A write multiplexer 56 responds to modulo-two frame count supplied it via a connection 57 from control circuitry 11 to direct pyramid analyzer 4 results to RAM 51 for writing during odd-numbered frames and to RAM 52 for writing during even-numbered frames. A read multiplexer 58 responds to modulo-two frame count supplied it via a connection 59 from control circuitry 11 to select readout from RAM 52 to DPCM modulator 6 input port during odd-numbered frames and from RAM 51 to DPCM modulator 6 input port during even-numbered frames.

One skilled in the art will recognize that variants of formatter 5 where RAMs 51 and 52 are only partial-frame stores are possible as well. Furthermore, one skilled in the art will appreciate that variants of formatter 5 can be readily designed that will accommodate other types of pyramid analyzer 4 that do not use odd-symmetry quadrature mirror filters. This, at some cost in increased complexity.

Figure 3:
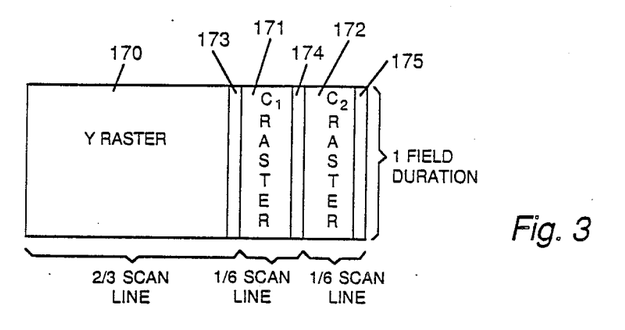
FIGS. 3 and 4 are drawings useful in explaining the composite image fields used in line-sequential pyramid processing a plurality of raster-scanned image variables according to the principles of the invention.

FIG. 3 shows how the composite image field raster-scanned from multiplexer 3 to the pyramid analyzer 4 can be considered in regard to the FIG. 1 video teleconferencing station as thusfar considered. A Y raster-scanned field 170, a $C_1$ raster-scanned field 171 and a $C_2$ raster-scanned field 172 are arranged side by side. Scan lines (not specifically shown extend across all these fields and line advance is considered to be in the vertical direction (conventionally from top to bottom). If desired, brief blanking intervals 173, 174 and 175 may separate fields 170, 171 and 172 from each other to reduce the possibility of cross-color among the Y, $C_1$ and $C_2$ components in middle horizontal spatial-frequency bands at left and right extremes of the display. Each line of the Y raster and the ensuing blanking interval, if any, occupies two-thirds of a camera 2 scan line time (including trace and retrace intervals). Each line of the $C_1$ raster and the ensuing blanking interval, if any, occupies one-sixth of a camera 2 scan line. So does each line of the $C_2$ raster and the ensuing blanking interval. The 4:1 horizontal compression of $C_1$ and $C_2$ signals respective to Y signal is accomplished in the scan line compressors 31–33 and is permissible since camera 2 low-pass filters $C_1$ and $C_2$ to narrower bandwidth than Y in the horizontal direction. This 4:1 horizontal compression of $C_1$ and $C_2$ is in effect a frequency-quadrupling process that multiplies the spatial frequencies of $C_1$ and $C_2$ to extend over a bandwidth commensurate with that of Y. Higher-horizontal-frequency components of the analysis by pyramid analyzer 4 will no longer be zero-valued as the $C_1$ and $C_2$ rasters are scanned. This means that the pyramid analysis of $C_1$ and $C_2$ proceeds to lower octaves than the pyramid analysis of Y. Another effect is that when higher spatial-frequency components of the FIG. 3 image field cannot be transmitted owing to FIFO data buffer 9 tending to overfill, the viewing distance at which the loss horizontal resolution is first perceptible increases similarly for chrominance and for luminance. This occurs automatically without having to treat the $C_1$ and $C_2$ components of the composite image field separately from the Y component.

The FIG. 3 composite image field raster keeps as low as possible the rate of read-out from the one of the scan line compressors 31–33 temporarily storing luminance signal. This saves operating power for the scan line compressor. (While it is desirable to decrease the number of samples per scan line to just above Nyquist limit insofar as saving power in the multiplexer 3, pyramid analyzer 4, formatter 5 and differential pulse code modulator 6 is concerned, such minimal sampling rate exacerbates the problem of amplitude quantization in quantizer 62 generating alias spatial frequencies. Better design practice is to choose a sample rate at least twice Nyquist rate to keep aliasing acceptably low, as known to the present inventor from a co-worker, E. H. Adelson. Some of the increase in the data rate from modulator 6 is offset by the fact of zero run lengths tending to be longer.) Where there is less concern for saving power in the scan line compressors 31–33 and formatter 5, one may contemplate alternative modes of operation in accordance with other aspects of the invention.

Figure 4:
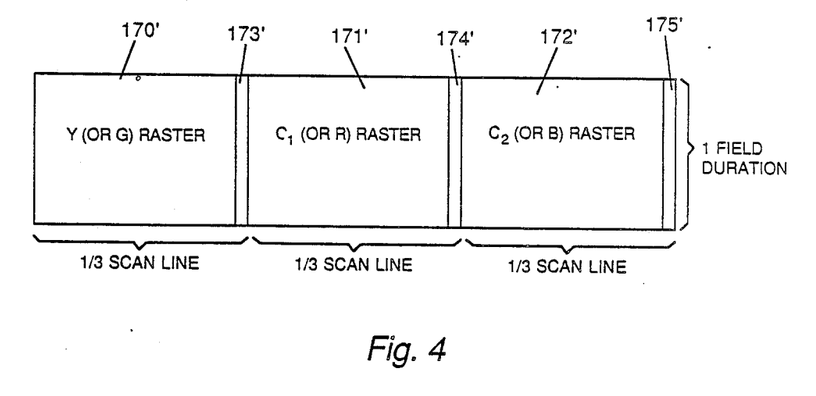

FIG. 4 shows another way the composite image field raster-scanned from multiplexer 3 to the pyramid analyzer 4 can be considered. In this mode of operation each of the scan line compressors 31–33 of FIG. 1 is read out in a respective period extending over substantially one-third a scan line of camera 2. That is, for example, the Y (or G) signal raster 170' is located in the left third of the composite image field the $C_1$ (or R) raster 171' is located in the middle third of the composite image field; and the $C_2$ (or B) raster 172' is located in the right third of the composite image field. Component rasters 170'–172' may be separated by short blanking intervals 173', 174' and 175' to reduce or avoid the possibility of cross-color in middle spatial frequencies.

Where scan line compressors 31, 32 and 33 provide temporary storage for Y, $C_1$ and $C_2$ signals respectively the upper spatial frequencies of $C_1$ and $C_2$ in both horizontal and vertical directions are less necessary than those of Y in satisfying the spatial resolution needs of the human visual system. Accordingly, the components of the spatial-frequency analyses of $C_1$ and $C_2$ descriptive of these higher spatial frequencies (to the extent camera 2 filtering permits them to exist) may be discarded in the pipeline output from the formatter 5. No provision is provided in RAMs 51 and 52 for storage of these components. Write multiplexer 56 protocol is to ignore these high-spatial-frequency components of $C_1$ and $C_2$ supplied to its input port and not write them into memory. (This may be done by withholding write enable signals from RAMs 51 and 52 at appropriate times if these RAMs are of a type permitting. Read multiplexer 58 protocol is to select zero for application to differential pulse code modulator 6 during the times the discarded samples would appear, rather than reading out stored samples from a selected one of RAMs 51 and 52. (If the RAMs 51 and 52 are of a type permitting, this may be done by withholding read enable signals from both of them at appropriate times.)

At the same time, samples being read from the one-frame delay line 65 are replaced by zeros. This causes the DPCM signal from modulator 6 to be zero-valued during the times $C_1$ and $C_2$ high-spatial-frequence components are being discarded. Also, however, since zeros are circulated back to adder 64 rather than the samples read from the one-frame delay line 65, one avoids these samples causing mistaken predictions of input signal in subsequent frames. The long zero runs invariably appearing at the times the omitted $C_1$ and $C_2$ components would occur in the pipeline output from formatter 5 are efficiently coded by the zero run length encoder 68.

Where scan line compressors 31, 32 and 33 provide temporary storage for green, red and blue signals respectively, one may arrange for high-spatial-frequency green to substitute as a mixed highs signal and then discard the high-spatial-frequency components of red and blue. (This expediency is sometimes used in the horizontal direction in color television broadcasting.) If this expedient is pursued, appropriate arrangements must be made in the color matrixing circuitry of the receiving apparatus to add in the high-spatial-frequency green components with the low-spatial-frequency components of each of the green, red and blue signals.

Returning consideration to the operation of the FIG. 1 sending apparatus for transmitting the composite image field of FIG. 3, where pyramid analyzer 4 is of the quadrature mirror filter type, samples of the vertical-direction high-spatial-frequency components of the $C_1$ and $C_2$ signals are preferably replaced by zeroes in the pipeline output of formatter 5 using appropriate write multiplexer 56 and read multiplexer 58 protocols. This is done in accordance with the teachings set forth above in regard to operation of the FIG. 1 sending apparatus for transmitting the composite image field of FIG. 4.

Figure 5:
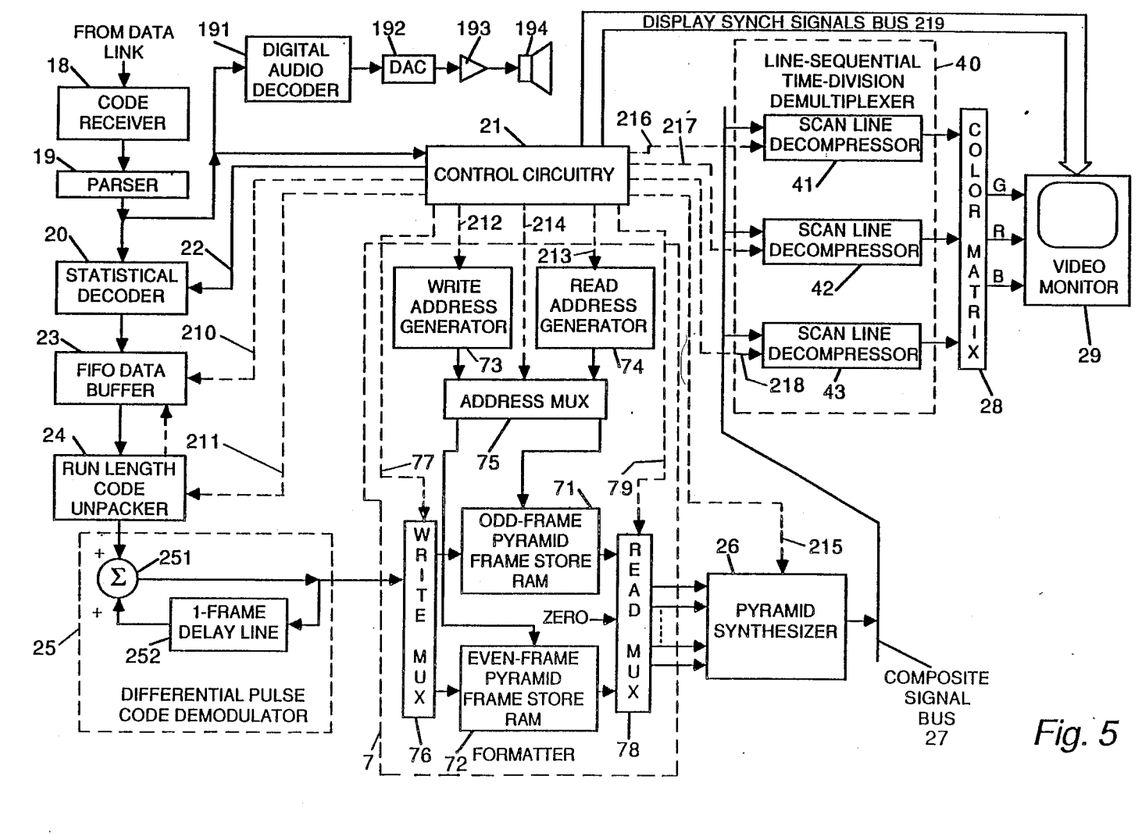
FIG. 5 is a schematic diagram of the receiving apparatus in a video teleconferencing station, which receiving apparatus embodies an aspect of the invention.

FIG. 5 shows a receiving apparatus for a teleconferencing station, which receiving station is suitable for receiving signal from a FIG. 1 sending station. A code receiver 18 converts signal received from a data link (which by way of example may be phase shift keyed signal) to a succession of binary code values parsed into codewords by a parser 19. Certain of the codewords from parser 19 are synchronization and control codewords decoded by control circuitry 21 for the FIGURE S receiving apparatus. Others of the codewords are digital audio codewords decoded by a digital audio decoder 191 to recover digital audio signal converted to analog audio signal by a digital-to-analog converter 192. The analog audio signal is amplified by an amplifier 193 for application to a loudspeaker 194.

Of particular interest to the invention are the statistical codewords descriptive of video. These statistical code words are decoded (e.g. by look-up table read-only memory) in a statistical decoder 20. Where the statistical encoder 8 of the FIG. 1 sending apparatus is of a type where statistical coding procedure is changed from time to time depending on the occupancy of storage locations of the FIFO data buffer 9, statistical decoder 20 will receive instructions from control circuitry 21 to accommodate its decoding scheme to the changed coding scheme, these instructions being communicated via a connection 22 from control circuitry 21 to statistical decoder 20. (Control circuitry 21 generates these instructions responsive to certain synchronization and control words appearing in parser 19 output signal.) Statistical decoder 20 directly specifies the non-zero sample values that are the nominal values of the range bins in the FIG. 1 digital pulse code modulator 6, avoiding the need for separate bin number decoder in a differential pulse code demodulator 25 used later on in the reconstitution of the color images. Statistical coder 20 also specifies in code terms the length of zero runs that occur from time to time among non-zero samples. The successive digital output signal values from the statistical decoder 20 are supplied as input signal to a first-in/first-out data buffer 23.

FIFO data buffer 23 clocks out non-zero samples at pyramid-analyzer 4 pixel scan rate responsive to clocking signals supplied to buffer 23 from control circuitry 21. These non-zero samples pass through a run length code unpacker 24 to differential pulse code demodulator 25. Run length code unpacker 24 responds to a zero run length code appearing at data buffer 23 output port to select to demodulator 25 a zero value rather than the output value from buffer 23. Unpacker 24 further responds to the zero run length code to enable a counter therewithin. This counter counts pixel scan rate pulses supplied unpacker 24 from control circuitry 21 via a connection 211. Unpacker 24, under control of this counter, internal to itself, reapplies the zero value to demodulator 25 the number of times specified by the run length code. Unpacker 24, also under control of its internal counter, sends back to FIFO data buffer 23 a halt signal delaying the next clock out from data buffer 23 until the zero run has been regenerated in its entirety for application to demodulator 25.

Differential pulse code demodulator 25 includes an adder 251 clocked at pyramid analyzer 4 pixel scan rate. Adder 251 has a first addend input port to which the output port of run length code unpacker 24 connects, has a second addend input port, and has a sum output port for supplying the digital pulse code demodulator 25 output signal. This signal is delayed by one frame time in a clocked delay line 252 for application to the second addend input port of adder 251, thereby completing the demodulator loop. Differential pulse code demodulator 25 output signal resembles the signal that formatter 5 supplies to digital pulse code modulator 6 in the FIG. 1 sending apparatus.

The parallel samples to serial samples conversion and any other permutation procedure carried out by formatter 5 in the FIG. 1 sending apparatus has to be undone in the FIG. 5 receiving apparatus to obtain input signals for a pyramid synthesizer 26. A sample formatter 7 in the FIG. 2 receiving station does this, supplying to pyramid synthesizer 26 signals generally similar to those supplied from the pyramid analyzer 4 in FIG. 1.

Formatter 7 includes an odd-frame pyramid frame store RAM 71 and an even-frame pyramid frame store RAM 72 analogous to RAMs 51 and 52, respectively, of FIG. 1 formatter 5. Formatter 7 also includes a write address generator 73, a read address generator 74, an address multiplexer 75, a write multiplexer 76 and a read multiplexer 78.

Write address generator 73 responds to synchronizing information, which is supplied via a connection 212 from control circuitry 21, to scan the storage locations in the one of RAMs 71 and 72 selected for writing in the current frame This scan is in the same pattern that read address generator 54 scans in the FIG. 1 sending apparatus formatter 5. Read address generator 74 responds to synchronizing information, which is supplied via a connection 213 from control circuitry 21, to scan the storage locations in the one of RAMs 71 and 72 selected for reading in the current frame. This scan is in the same pattern that write address generator 53 scans in the FIG. 1 formatter 5.

Address multiplexer 75 receives via connection 214 from control circuitry 21 an indication of whether an odd frame is to be written and an even frame is to be read or vice versa. Multiplexer 75 responds to apply the write address from generator 73 and the read address from generator 74 to the appropriate ones of RAMS 71 and 72 for each successive frame. Write multiplexer 76 responds to control signals supplied from control circuitry 21 via a connection 77 to write the output signal from demodulator 25 to the one of RAMs 71 and 72 selected for writing in each successive frame. Read multiplexer 78 responds to control signals supplied from control circuitry 21 via a connection 79 to read, from the one of RAMs 71 and 72 selected for reading in each successive frame, to the input port of pyramid synthesizer 26 appropriate to the current sample of input signal thereto.

Pyramid synthesizer 26 regenerates the composite field image samples, with three color variables appearing in line-sequential order. This serial stream of samples, similar to that originally provided on the FIG. 1 composite signal bus 34, is supplied by pyramid synthesizer 26 to another composite signal bus 27 in the FIG. 2 sending station. Scan line decompressors 41, 42 and 43 perform respective time-division de-multiplexing operations on the stream of samples bus 27 delivers to de-multiplexer 40, thereby to recover respective ones of the color component signals for application to color matrixing circuitry 28. Color matrixing circuitry 28 responds with a green (G) digital video signal, a red (R) digital video signal and a blue (B) digital video signal. These green, red and blue signals are supplied to a video monitor 29. Display synchronization signals are supplied to video monitor 29 from control circuitry 21 via a bus 219.

Consider more particularly now an example of how scan line decompressors 41–43 can work. Responsive to timing signals supplied it from control circuitry 21 via a connection 216 scan line decompressor 41 selects time-compressed lines of Y signal samples appearing on bus 27 and stretches them to fit the trace time of video monitor 29. Responsive to timing signals supplied it from control circuitry 21 via a connection 217 scan line decompressor 42 selects time-compressed lines of $C_1$ signal samples appearing on bus 27 and stretches them to fit the trace time of video monitor 29. Responsive to timing signals supplied it from control circuitry 21 via a connection 218 scan line decompressor 43 selects time-compressed lines of $C_2$ signal samples appearing on bus 27 and stretches them to fit the trace time of video monitor 29.

Figure 6:
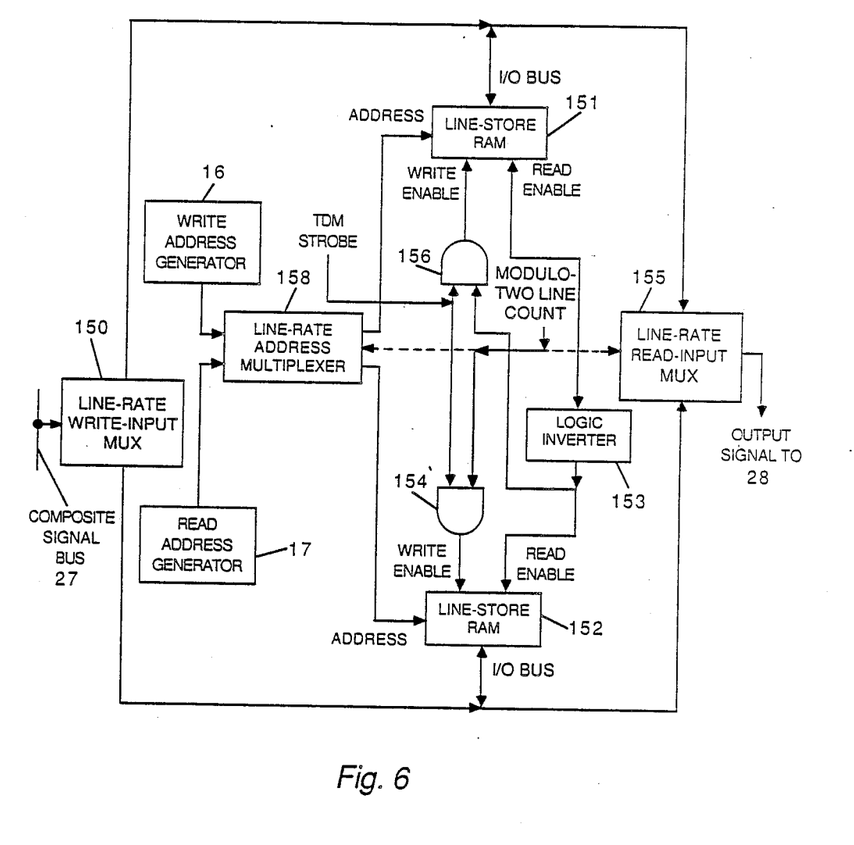
FIG. 6 is a schematic diagram of a scan line decompressor as can be used in the FIG. 5 apparatus.

FIG. 6 shows in greater particularity a structure for a scan line decompressor such as 41, 42 or 43. Successive scan lines in video monitor 29 are considered to be consecutively numbered beginning with unity in each frame. A write-input multiplexer 150 responds to modulo-two scan line count, as supplied from control circuitry 21, to select odd-numbered scan lines of composite signal from bus 27 to the input/output bus of a first random-access memory 151 and to select even-numbered scan lines of composite signal to the input/output bus of a second random-access memory 152. A preferable way to construct multiplexer 150 is using respective ranks of tri-state latches to supply data to the input/output busses of RAMs 151 and 152, for reasons discussed in detail above in regard to multiplexer 120. Each of the RAMs 151 and 152 has sufficient addressable memory locations to serve as a line store.

Modulo-two line count is applied to the read enable connection of RAM 151, conditioning RAM 151 for reading only during odd-numbered lines. Modulo-two line count is supplied to a logic inverter 153. The resulting complement of line count supplied from inverter 153 is applied to the read enable connection of RAM 152. Modulo-two count also controls a read-output multiplexer 155 which selects as input signal to an input port of color matrixing circuitry 28 the read-out from the one of RAMs 151 and 152 conditioned for reading by receiving unit-value read enable signal.

An AND gate 154 conditionally applies modulo-two line count, during unit-value TDM strobe pulse only, to the write enable connection of RAM 152. RAM 152 is thereby conditioned for writing during the portions of odd-numbered lines when unit-value TDM strobe pulses occur.

An AND gate 156 conditionally applies the complement of modulo-two line count, during unit-value TDM strobe pulse only, to the write enable connection of RAM 152. RAM 152 is thereby conditioned for writing during the portions of even-numbered lines when unit-value TDM strobe pulses occur.

Modulo-two line count also controls an address multiplexer 158, which selects the output of a write address generator 16 to the address port of RAM 151 during odd-numbered lines and to the address port of RAM 152 during even-numbered lines. Address multiplexer 158 also selects the output of a read address generator 17 to the address port of the RAMs 151 and 152 not selected to receive the output of write address generator 16.

Read address generator 17 typically includes a pixel counter reset to zero at the beginning of each scan line and counting throughout each scan line at video monitor 29 pixel scan rate for the particular image variable of concern. This pixel counter (not explicitly shown in FIG. 6) supplies its count as read address output for generator 17. Write address generator 16 typically includes a counter counting at higher rate than the pixel counter in read address generator 17. This higher counting rate provides for scan line de-compression.

In practice, it is convenient to use a single pixel counter counting at Y scan rate to provide read addresses to the line-store RAMs selected for writing in each of the scan line de-compressors 41-43. Where I and Q scan rates are octaves lower than Y scan rate, only the more significant bits of the pixel count are used as read addresses to the line-store RAMs in them selected for writing.

Also it is convenient to use a single higher-rate counter to generate from the less significant bits of its count write addresses for the line-store RAMs selected for reading in each of the scan line decompressors 41-43. The more significant bits of its count can be decoded to generate cyclically TDM strobe pulses for each of the scan line decompressors 41-43.

A more coherent description will now be made of the steps the control circuitry 11 of the FIG. 1 sending apparatus takes to control the occupancy of the FIG. 1 FIFO data buffer 9. This description will also refer to the steps taken in concert therewith by the control circuitry 21 of the FIG. 5 receiving apparatus for adjusting the operation of the receiving apparatus to track the adjusted operation of the FIG. 1 sending apparatus. In the FIG. 1 sending apparatus control circuitry 11 senses the occupancy of the storage locations in data buffer 9 via connection 91 therefrom.

If the data buffer 9 tends to overfill, control circuitry 11 can send control signals via connection 66 to adjust the binning done by quantizer 62 to increase the width of the zero bin, or to more coarsely quantize, or to do both. If such steps are taken, signals can be sent to statistical encoder 8 to modify its coding table to suit—e.g. by selecting a different coding table from a group of look-up tables stored in read-only memory. Control circuitry 11 will then also generate a synchronizing codeword indicating the changes in bin allocation and coding table selection, which codeword is transmitted via connection 101 to the FIFO data buffer 9. In the FIG. 5 receiving apparatus control circuitry 21 detects this codeword and responds to its detection by sending instructions (via connection 22) to statistical decoder 20. Statistical coder 20 responds to these instructions to modify its decoding table to suit the binning in quantizer 62 and the coding table of statistical encoder 8. This modification can be made by selecting a different decoding table from a group of look-up tables stored in read-only memory.

Alternatively, if in the FIG. 1 sending apparatus the data buffer 9 tends to overfill, control circuitry 11 can respond by modifying the operation of read multiplexer 58 so it selects zeros during time slots normally filled by the samples of the discarded high-spatial-frequency spectra. At the same time, samples read from the one-frame delay line 65 are replaced by zeros. The differential pulse code modulator 6 then supplies zero bin numbers during these time slots. This reduces the number of non-zero values to be coded by the zero-run length encoder 68 and statistical coder 8 in the FIG. 1 apparatus, and replaces them with long zero runs that can be efficiently coded. This tends to reduce the fill rate of FIFO data buffer 9 in a pronounced way.

It is noted in passing that a convenient way to construct the write and read address generators of a sending or receiving apparatus around a read-only memory storing the successions of write and read addresses in alternate phases in sequentially addressed storage locations of the read-only memory. The addresses of this read-only memory receive their most significant bits as binary-coded instructions, from the control circuitry of the sending or receiving apparatus, and the less significant bits of the addresses for this read-only memory are generated in sequence by a counter clocked at the sample rate through the formatter.

If one of the write address and read address sequences consists of consecutive numbers, an alternative construction that conserves read-only memory can be employed. A counter generates the address sequence consisting of consecutive numbers, which address sequence addresses a read-only memory storing the other address sequence. The read and write addresses are strobed alternately, one from the counter output and the other from the read-only memory output. Read-only memory is halved in size; so is its rate of reading.

One armed with the foregoing disclosure and skilled in the art of designing systems for the digital transmission of video and accompanying sound will be equipped to design many variants of the apparatuses described herein. This should be borne in mind in construing the broader ones of the claims which follow this application. Some illustrative examples of design refinements follow.

Poly-phase operation of pyramid analyzer 4 to reduce the sample rates therein has been disclosed above in regard to FIG. 1 sending apparatus. Poly-phase operation can be initiated before pyramid analyzer 4 and scan line compressors 31-33 to decrease the sample rate through the line compressors as well as in the pyramid analyzer 4. This procedure allows the use of slower digital hardware and some saving of operating power. In the FIG. 5 receiving apparatus, similar advantages obtain with poly-phase operation in the direction parallel to scan lines both in the pyramid synthesizer 26 and in the scan line decompressors 41-43 as well.

The need for scan line compression of Y in an early stage of the sending apparatus of a video teleconferencing station can be avoided by pyramid analysis of the Y signal separately from pyramid analysis of the $C_1$ and $C_2$ signals, which are placed into line-sequential format without including Y signal for pyramid analysis in parallel with Y signal. The two pyramid analyzers, one for Y signal and the other for line-sequential $C_1$ and $C_2$ signals, are provided with respective formatters. These formatters have read multiplexing that time interleaves their respective output signals to the input port of a single differential pulse code modulator, and the remainder of the sending station is per FIG. 1. In addition to saving a scan line compressor for Y signal, scan line compressors for the $C_1$ and $C_2$ signals may be operated at lower output rates. The pyramid analyzers are operable at lower rates, although two are required. The rates of writing random access memory in the formatters is reduced. This alternative makes it possible to achieve high-resolution color transmission at reduced memory speeds. Scan line compression for Y takes place in the formatter. Analogously, the need for a scan line decompressor for Y in the final stages of the receiving apparatus of a teleconferencing station can be avoided, by using its formatter for decompressing Y and using separate pyramid synthesizers for Y luminance signal and for the time-division-multiplexer $C_1$ and $C_2$ chrominance signals. Variants of this arrangement wherein high-spatial-frequency luminance pyramid processing is done in parallel with the pyramid processing of line-sequentially time-division multiplexed low-spatial-frequency luminance and chrominance components are attractive designs. This procedure is possible because of the general generating precepts discussed in the next paragraph.

Each stage of two-dimensional pyramid analysis customarily involves 2:1 decimation in the direction parallel to line scan and 2:1 decimation in the direction perpendicular to line scan. The latter decimation involves the discarding of alternate scan lines of filter response in the signal for application to the next stage of pyramid analysis. This is a species of line compressor operation, it may be noted. Accordingly, if two raster-scanned video signals having their respective line scans synchronized and having a similar number of samples per scan line are subjected to their respective first stages of pyramid analysis in parallel, and if the 2:1 decimation of their pyramid responses are in different rather than the same spatial phasing, a multiplexer operated at line scan rate can combine the signals for application to the next stage of pyramid analysis in a line-sequential manner. This allows the later stages of pyramid analysis for these signals to be performed on a time-division multiplexed basis in the same digital hardware, in accordance with the present invention. Pyramid synthesis of two signals using shared digital hardware in all but the final stage is also possible in accordance with the present invention.

The desirability of pyramid processing using separable quadrature mirror filters with odd-symmetry kernels has been pointed out, in regard to the time-interleaving of the spectral components when writing into formatter 5 of the FIG. 1 sending apparatus and when reading out from formatter 7 of the FIG. 2 receiving apparatus. Where formatter 5 is simply called upon for converting parallel streams of data into a serial stream of data, this can be done without need for temporary storage, formatter 5 degenerating to a simple time-division multiplexer. Formatter 7 can in such case be just a simple time-division multiplexer as well. The cost of doing this is that zero run lengths are not as likely to be long, encryption of video cannot be done in formatter 5, and decryption of video cannot be done in formatter 7.

While the invention has been specifically described in connection with the color transmission of teleconferencing video data, the invention is applicable to other image processing problems. The line-sequential time-division-multiplexing of other independent-variable image data such as stereoscopically related image data in connection with pyramid processing is a useful step in the digital transmission of the image data, for example. The Adelson and Burt inventions mentioned in the first paragraph of the BACKGROUND OF THE INVENTION can also be modified to usefully employ the present invention, particularly in the lower-spatial-frequency processing where sample rates are lower. The line-sequential time-division multiplexing of video signals derived from cameras viewing entirely different scenes can be used in connection with pyramid processing in still other embodiments of the present invention.

Embodiments of the present invention may use interlaced raster-scanned video or may use progressive scan, as one skilled in the art will readily appreciate.

What is claimed is:

1. Apparatus for performing two-dimensional spatial-frequency filterings of each of a plurality of signals each descriptive of a raster-scanned image field sampled-data variable, said raster-scanned image field sampled-data variables having the same number of scan lines in their respective raster scans, said apparatus comprising:

a respective time compressor for each of said plurality of signals, having the capability of time compressing a full scan line of its respective signal;

means for timing the operation of said time compressors to time-division-multiplex said signals for interleaving successive ones of their respective scan lines on a cyclic basis; thereby to form a line-sequential composite signal which is a raster-scanned sampled-data description of a plurality of side-by-side image fields; and a first two-dimensional spatial-frequency filter receptive of said composite signal.

2. Apparatus as set forth in claim 1 wherein said raster-scanned image field sampled-data variables are raster scanned parallel in time.

3. Apparatus as set forth in claim 1 wherein at least two of said raster-scanned image field sampled-data variables have the same number of samples in each of their respective scan lines.

4. Apparatus as set forth in claim 1 wherein said first two-dimensional spatial-frequency filter is one of a plurality of two-dimensional spatial-frequency filters arranged as a pyramid analyzer for analyzing said raster-scanned sampled-data description of a plurality of side-by-side image fields into component spatial-frequency spectra in sampled-data form.

5. Apparatus as set forth in claim 4 in combination with:

a formatter for arranging the samples of said component spatial-frequency spectra into a serial stream of samples.

6. A combination as set forth in claim 5 including:

a differential pulse code modulator for generating a differential pulse code response to said serial stream of samples.

7. A combination as set forth in claim 6 wherein said differential pulse code modulator is of a type differentially comparing samples separated by a frame time delay.

8. A combination as set forth in claim 6 further including:
means for statistically encoding said differential pulse code to generate a succession of self-parsing statistical codes.

9. A combination as set forth in claim 8 wherein said means for statistically encoding said differential pulse code includes:
a zero run length encoder for determining the lengths of runs of zeroes in said differential pulse code, and
means for selecting the statistical codes for zero-value samples in said differential pulse code dependent upon the length of zero runs in which those samples are included.

10. A sending apparatus, comprising in addition to the combination of claim 8:
means for generating digital audio codes;
means for generating synchronizing codes indicative of the framing of said raster-scanned sampled-data description of a plurality of side-by-side image fields and of the signals derived therefrom;
means for generating a serial stream of bits from said statistical codes, said digital audio codes, and said synchronizing codes; and
a transmitter for transmitting over a data link a signal responsive to said serial stream of bits.

11. A combination of:
a pyramid synthesizer, receptive of the component spatial-frequency spectra in sampled-data form of a raster-scanned sampled-data description of a plurality of side-by-side image fields, for synthesizing said raster-scanned sampled-data description of a plurality of side-by-side image fields; and
a respective time decompressor for each of said plurality of side-by-side image fields, arranged to accept as its respective input signal samples descriptive of its respective image field and to provide a raster-scanned output of its respective image field synchronously with each other of said time decompressors.

12. A receiving apparatus, comprising in addition to the combination of claim 11:
a receiver for receiving from a data link a signal, responsive to which said receiver supplies a serial stream of bits;
means responsive to said serial stream of bits for separating digital audio codes, synchronizing codes indicative of the framing of said raster-scanned sampled-data description of a plurality of side-by-side image fields, and statistical codes descriptive of a differential pulse code modulation signal encoding said raster-scanned sampled-data description of a plurality of side-by-side image fields;
means for decoding said statistical codes to recover said differential pulse code modulation signal;
a demodulator for said differential pulse code modulation signal;
a formatter for arranging data samples from said demodulator to supply to said pyramid synthesizer said component spatial-frequency spectra in sampled-data form of the raster-scanned description of a plurality of side-by-side image fields;
a video monitor for providing a display;
means for applying video input signals to said video monitor in response to the raster-scanned outputs of their respective image fields supplied by said time decompressors; and
means responsive to at least some of said synchronizing codes for supplying said video monitor information with which to synchronize its display.

13. A method for analyzing the spatial-frequency spectra of first and second raster-scanned video signals, said method comprising the steps of:
time-division multiplexing said first and second raster-scanned video signals together to form a line-sequential third raster-scanned video signal, and
performing a pyramid analysis of said third raster-scanned video signal.

14. A method for synthesizing first and second raster-scanned video signals from the spatial-frequency spectra of a third raster-scanned video signal of a type as is formed by line-sequential time-division multiplexing of said first and second raster-scanned video signals, said method comprising the steps of:
performing a pyramid synthesis of said third raster-scanned video signal from its said spatial frequency spectra,
time-division demultiplexing said third video signal for separating samples descriptive of scan lines of first video signal and samples descriptive of scan lines of second video signal, and
resampling each set of separated samples so the raster scanning of said first video signal and the raster scanning of said second video signal are in synchronism with each other.

* * * * *